March 29, 1932.  T. W. RIEDER  1,851,867
AIRPLANE
Filed July 23, 1930  4 Sheets-Sheet 3
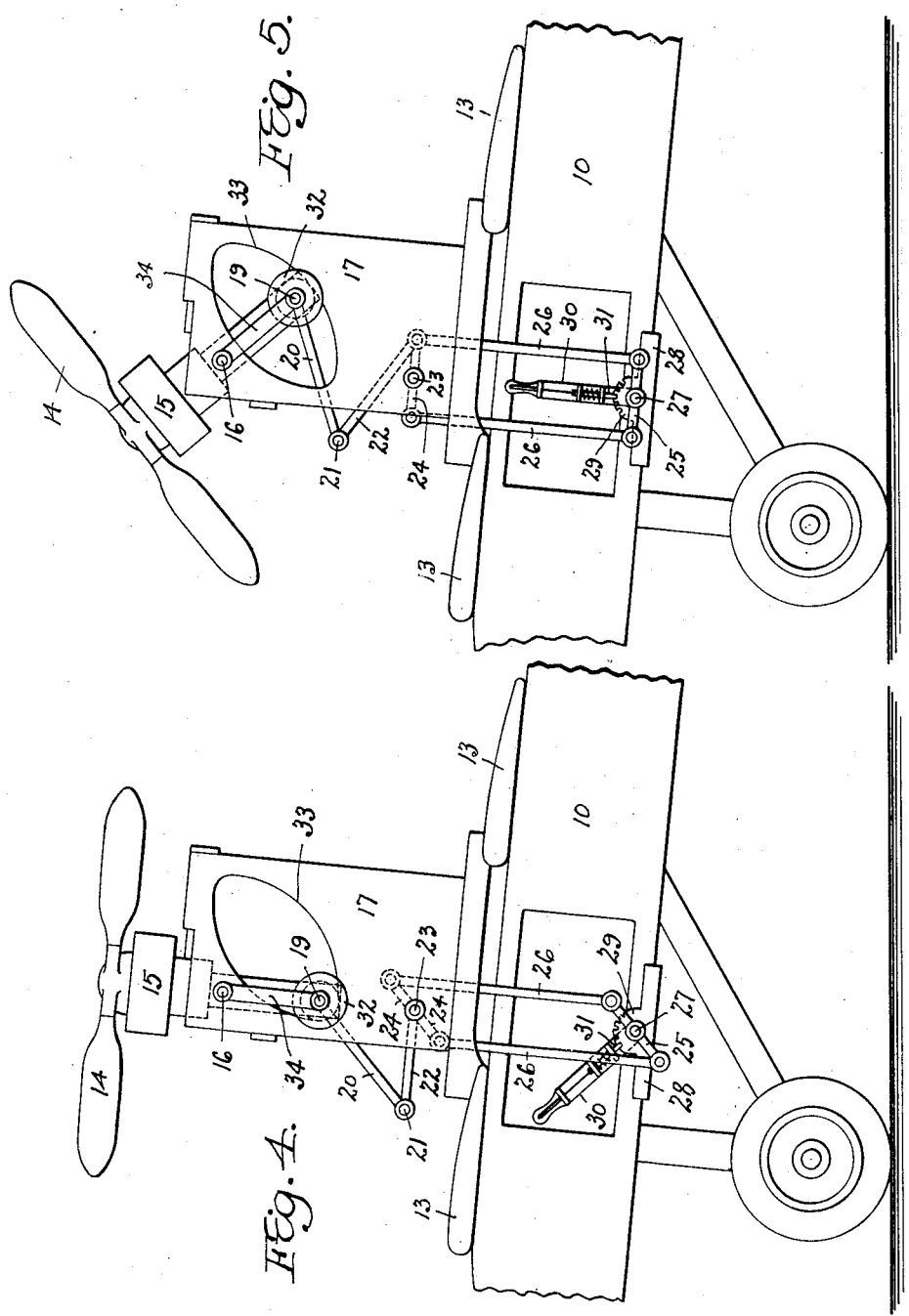
Thomas W. Rieder
INVENTOR
BY Victor J. Evans
ATTORNEY

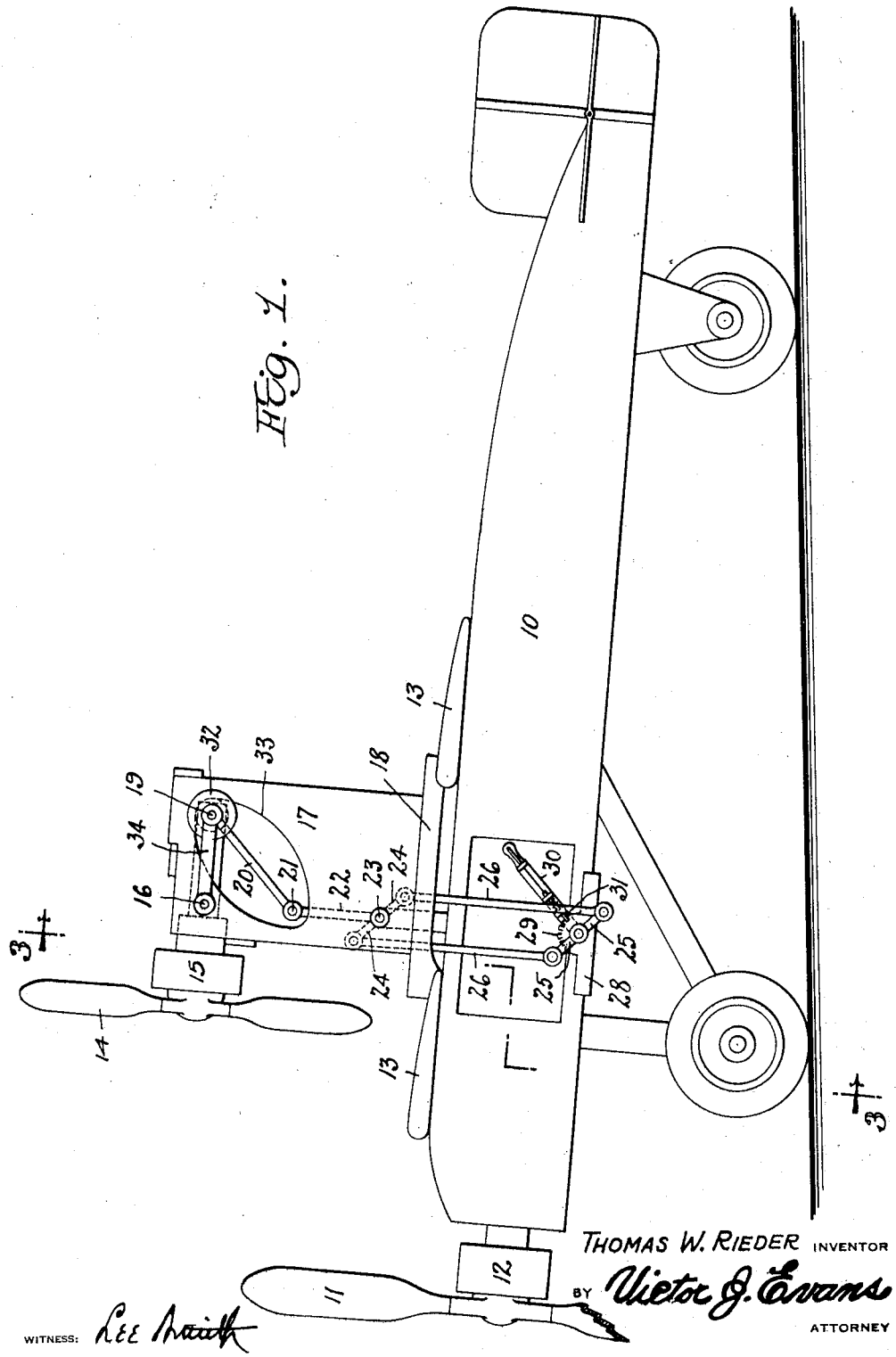

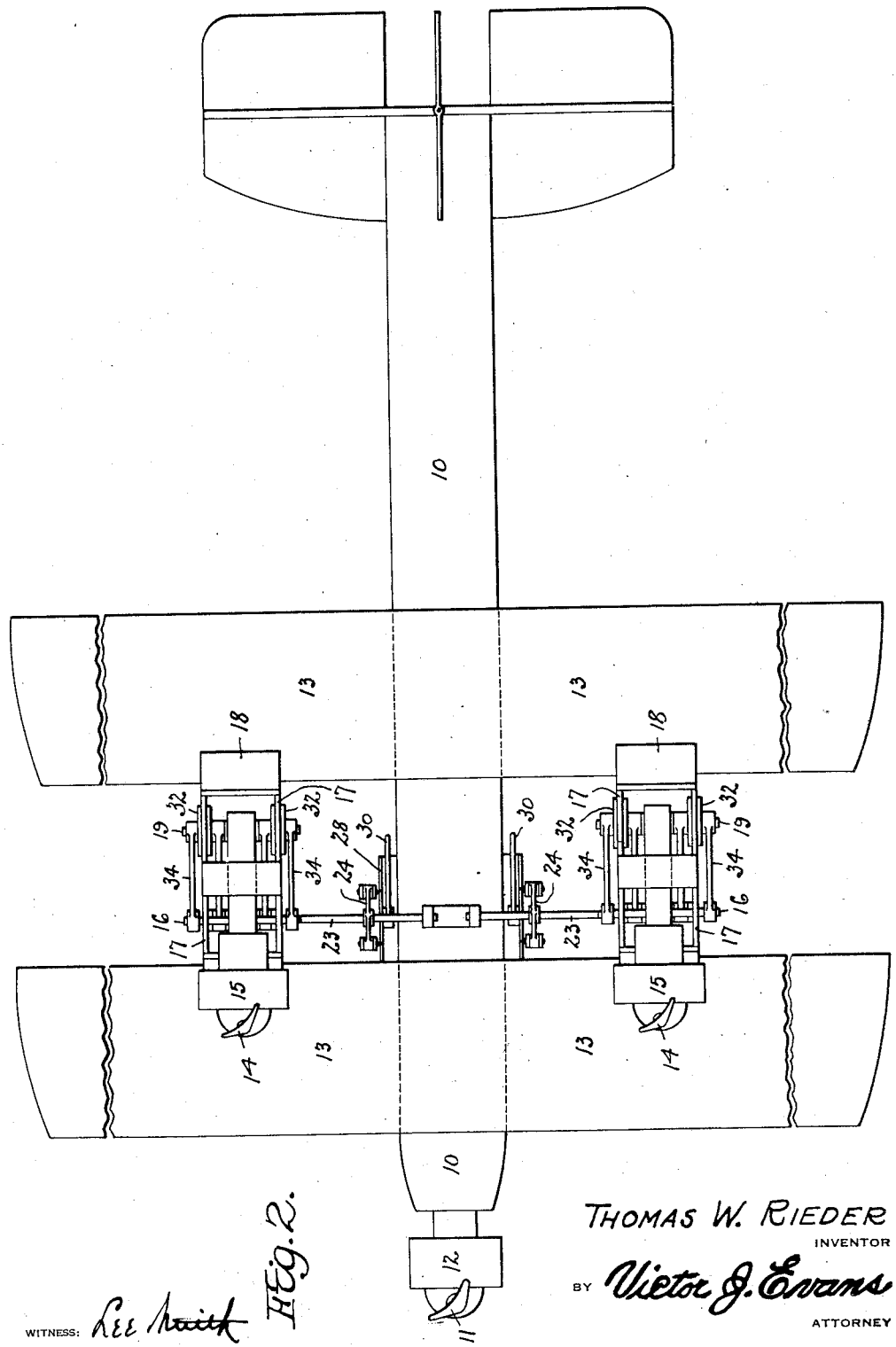

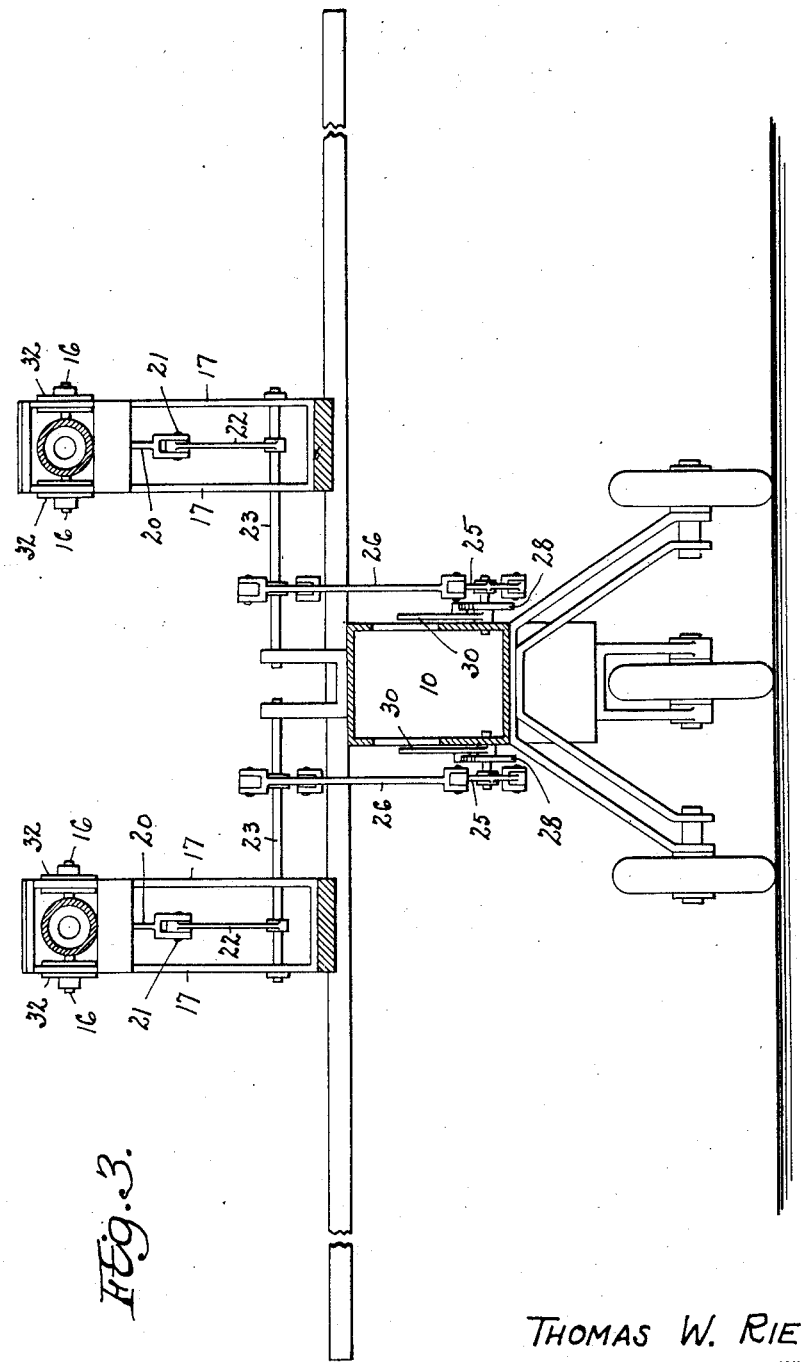

Patented Mar. 29, 1932

1,851,867

UNITED STATES PATENT OFFICE

THOMAS W. RIEDER, OF PITTSBURGH, PENNSYLVANIA

AIRPLANE

Application filed July 23, 1930. Serial No. 470,190.

This invention relates to aircraft and more particularly to the "heavier than air" type, an object being to provide an airplane with means to facilitate "taking off" and "landing", so that these operations may be performed upon a relatively small field.

To this end, the invention provides a main traction propeller or propellers, and an auxiliary propeller or propellers, together with means whereby the latter may be adjusted to provide lifting or sustaining propellers for use in a "take off" or "landing", or for use as traction propellers during flight.

The invention further includes means for mounting the auxiliary propellers to permit of such adjustment and for guiding and taking the thrust of the auxiliary propellers irrespective of their adjusted positions.

With the above and other objects in view, the invention further includes the following novel features and details of construction, to be hereinafter more fully described, illustrated in the accompanying drawings and pointed out in the appended claim.

In the drawings:—

Figure 1 is a side elevation of an airplane equipped with the invention with the auxiliary propellers positioned for use as traction propellers.

Figure 2 is a top plan view of the same.

Figure 3 is a section taken substantially on the line 3—3 of Figure 1.

Figure 4 is a fragmentary side elevation showing the auxiliary propellers arranged for a direct lifting or sustaining action.

Figure 5 illustrates the auxiliary propellers in an intermediate position.

Referring to the drawings in detail wherein like characters of reference denote corresponding parts, the reference character 10 indicates the fuselage of an airplane which is provided with a main traction propeller 11, driven by an engine 12. The reference character 13 indicates the wings or airfoils of the plane and any number of these wings may be employed. For example, the plane may consist of a single wing, or a plurality of wings, two wings being shown.

The reference character 14 indicates a pair of auxiliary propellers, one of which is mounted upon each side of the fuselage. These propellers are carried by the wings 13 and any number may be employed. The auxiliary propellers 14 are adapted to be adjusted as shown in Figure 4 so as to exert a direct upward pull to facilitate "take off" or "landing", or they may be adjusted as shown in Figure 5 to provide for a steep climb. In addition, they may be adjusted as shown in Figure 1 to serve as traction propellers.

The propellers 14 are mounted upon the drive shafts of engines 15, and as the propellers are capable of adjustment as described, the engines, and consequently the propellers 14 are mounted upon trunnions 16. These trunnions are mounted in vertically disposed spaced plates 17 which rise from supports or platforms 18 which bridge the wings 13 upon opposite sides of the fuselage.

The engines 15 extend inward between the plates 17 and carry at their inner ends shafts 19. Pivoted upon these shafts 19 are arms 20 and these arms are in turn pivotally connected as shown at 21 to arms 22 which are fast upon rock shafts 23 mounted in bearings provided in the plates 17. Also fast upon the shafts 23 are oppositely extending arms 24 and the outer ends of these arms are connected to similar arms 25 through the medium of links or rods 26. The arms 25 are mounted upon short shafts 27 whose outer ends are carried by bearing brackets 28 and these brackets carry toothed segments 29. Operating levers 30 which are fast to the shafts 27 have spring influenced dogs 31 to engage the teeth of the segments 29.

With the parts in the position shown in Figure 1, the propellers 14 are arranged as traction propellers and serve to assist the main traction propeller in flight. By means of the levers 30 and the connections with the shafts 19, the engines 15 and consequently the propellers 14 may be moved to the positions shown in Figures 4 and 5 or one of the intermediate positions. The propellers 14 will remain in their adjusted position due to the engagement of the spring influenced dogs 31 with the toothed segments 29.

In order to guide the engines 15 during their pivotal movement and to prevent side thrust and rear thrust, the shafts 19 have mounted thereon grooved rollers 32. These rollers engage the walls of substantially oval shaped openings 33 provided in the plates 17 so that the walls of these openings form a track for the rollers 32 and act to prevent lateral thrust irrespective of the adjusted position of the propellers 14. Arms 34 connect the shafts 19 with the trunnions 16.

The invention is susceptible of various changes in its form, proportions and minor details of construction and the right is herein reserved to make such changes as properly fall within the scope of the appended claim.

Having described the invention what is claimed is:—

In an airplane, an engine mount comprising spaced parallel plates having openings therein, an engine mounted for pivotal movement between the plates, grooved rollers carried by the engine and engaging the walls of the opening to guide and hold the engine in position, and means to adjust the engine pivotally.

In testimony whereof I affix my signature.

THOMAS W. RIEDER.